United States Patent
Liu et al.

(10) Patent No.: US 11,310,695 B2
(45) Date of Patent: Apr. 19, 2022

(54) MULTI-SUBFRAME DISCOVERY REFERENCE SIGNALING (DRS) MEASUREMENT TIMING CONFIGURATION (DMTC) WINDOW

(71) Applicant: QUALCOMM Incorporated, San Diego, CA (US)

(72) Inventors: Chih-Hao Liu, San Diego, CA (US); Srinivas Yerramalli, San Diego, CA (US); Arumugam Chendamarai Kannan, San Diego, CA (US); Tamer Kadous, San Diego, CA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/886,400

(22) Filed: Feb. 1, 2018

(65) Prior Publication Data

US 2018/0227797 A1    Aug. 9, 2018

Related U.S. Application Data

(60) Provisional application No. 62/454,656, filed on Feb. 3, 2017.

(51) Int. Cl.
*H04W 28/06* (2009.01)
*H04W 72/04* (2009.01)
(Continued)

(52) U.S. Cl.
CPC ............ *H04W 28/06* (2013.01); *H04L 5/005* (2013.01); *H04L 5/0053* (2013.01);
(Continued)

(58) Field of Classification Search
None
See application file for complete search history.

(56) References Cited

U.S. PATENT DOCUMENTS

| 2014/0198685 A1* | 7/2014 | Xu | H04W 24/02 370/254 |
| 2015/0172950 A1 | 6/2015 | Chen et al. | |

(Continued)

FOREIGN PATENT DOCUMENTS

WO    2016183941 A1    11/2016

OTHER PUBLICATIONS

ETRI: "Band-Agnostic Initial Access for NR", 3GPP Draft; R1-166944, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 21, 2016, 4 Pages, XP051140449, Retrieved from the Internet: URL: http://www.3gpp.org/ftp/Meetings_3GPP_SYNC/RAN1/Docs/ [retrieved on Aug. 21, 2016].

(Continued)

*Primary Examiner* — Peter Chen
*Assistant Examiner* — Jeff Banthrongsack
(74) *Attorney, Agent, or Firm* — Muncy, Geissler, Olds & Lowe, P.C./Qualcomm

(57) ABSTRACT

In an embodiment, an access point executes a Clear Channel Assessment (CCA) protocol to determine whether to begin transmission within a DRS Measurement Timing Configuration (DMTC) window. The access point transmits, based on a result of the execution, a multi-subframe DRS within the DMTC window, the multi-subframe DRS including a plurality of DRS subframes that each includes a plurality of symbols.

27 Claims, 8 Drawing Sheets

(51) Int. Cl.
    *H04W 74/08*     (2009.01)
    *H04L 5/00*      (2006.01)
    *H04W 48/16*     (2009.01)
    *H04W 16/14*     (2009.01)

(52) U.S. Cl.
    CPC ... *H04W 72/0446* (2013.01); *H04W 74/0816* (2013.01); *H04L 5/0048* (2013.01); *H04W 16/14* (2013.01); *H04W 48/16* (2013.01); *H04W 72/042* (2013.01); *H04W 74/0808* (2013.01)

(56) References Cited

U.S. PATENT DOCUMENTS

| | | | |
|---|---|---|---|
| 2016/0073366 A1* | 3/2016 | Ng | H04W 56/001 370/329 |
| 2016/0127098 A1 | 5/2016 | Ng et al. | |
| 2016/0135179 A1 | 5/2016 | Yin et al. | |
| 2017/0019924 A1 | 1/2017 | Wang et al. | |

OTHER PUBLICATIONS

International Search Report and Written Opinion—PCT/US2018/016766—ISA/EPO—dated May 17, 2018.
Taiwan Search Report—TW107103777—TIPO—dated Jun. 4, 2021.

* cited by examiner

MULTI-SUBFRAME DISCOVERY REFERENCE SIGNALING (DRS) MEASUREMENT TIMING CONFIGURATION (DMTC) WINDOW

CROSS-REFERENCE TO RELATED APPLICATIONS

The present Application for Patent claims the benefit of U.S. Provisional Application No. 62/454,656, entitled "ePBCH DESIGN AND CRS SCRAMBLING IN DRS FOR MULTEFIRE COVERAGE ENHANCEMENT", filed Feb. 3, 2017, which is assigned to the assignee hereof and hereby expressly incorporated by reference herein in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may need to coexist with the operations of other Radio Access Technologies (RATs) that typically utilize the same unlicensed bands, most notably IEEE 802.11x WLAN technologies generally referred to as "Wi-Fi."

SUMMARY

An embodiment is directed to a method of configuring a Discovery Reference Signaling (DRS) on a shared communication medium, including executing a Clear Channel Assessment (CCA) protocol to determine whether to begin transmission within a DRS Measurement Timing Configuration (DMTC) window, and transmitting, based on a result of the executing, a multi-subframe DRS within the DMTC window, the multi-subframe DRS including a plurality of DRS subframes that each includes a plurality of symbols.

Another embodiment is directed to an access point apparatus configured to transmit a DRS on a shared communication medium, including means for executing a CCA protocol to determine whether to begin transmission within a DMTC window, and means for transmitting, based on a result of the execution, a multi-subframe DRS within the DMTC window, the multi-subframe DRS including a plurality of DRS subframes that each includes a plurality of symbols.

Another embodiment is directed to an access point apparatus configured to transmit a DRS on a shared communication medium, including at least one processor coupled to at least one transceiver and configured to execute a CCA protocol to determine whether to begin transmission within a DMTC window, and transmit, based on a result of the execution, a multi-subframe DRS within the DMTC window, the multi-subframe DRS including a plurality of DRS subframes that each includes a plurality of symbols.

Another embodiment is directed to a non-transitory computer-readable medium containing instructions stored thereon, which, when executed by an access point apparatus configured to transmit a DRS on a shared communication medium, cause the access point apparatus to perform operations, the instructions including at least one instruction configured to cause the access point apparatus to execute a CCA protocol to determine whether to begin transmission within a DMTC window, and at least one instruction configured to cause the access point apparatus to transmit, based on a result of the execution, a multi-subframe DRS within the DMTC window, the multi-subframe DRS including a plurality of DRS subframes that each includes a plurality of symbols.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Techniques for transmitting a Discovery Reference Signaling (DRS) on a radio link of a shared communication medium are disclosed. In an aspect, the radio link may be a Long-Term Evolution (LTE) in unlicensed spectrum radio link.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
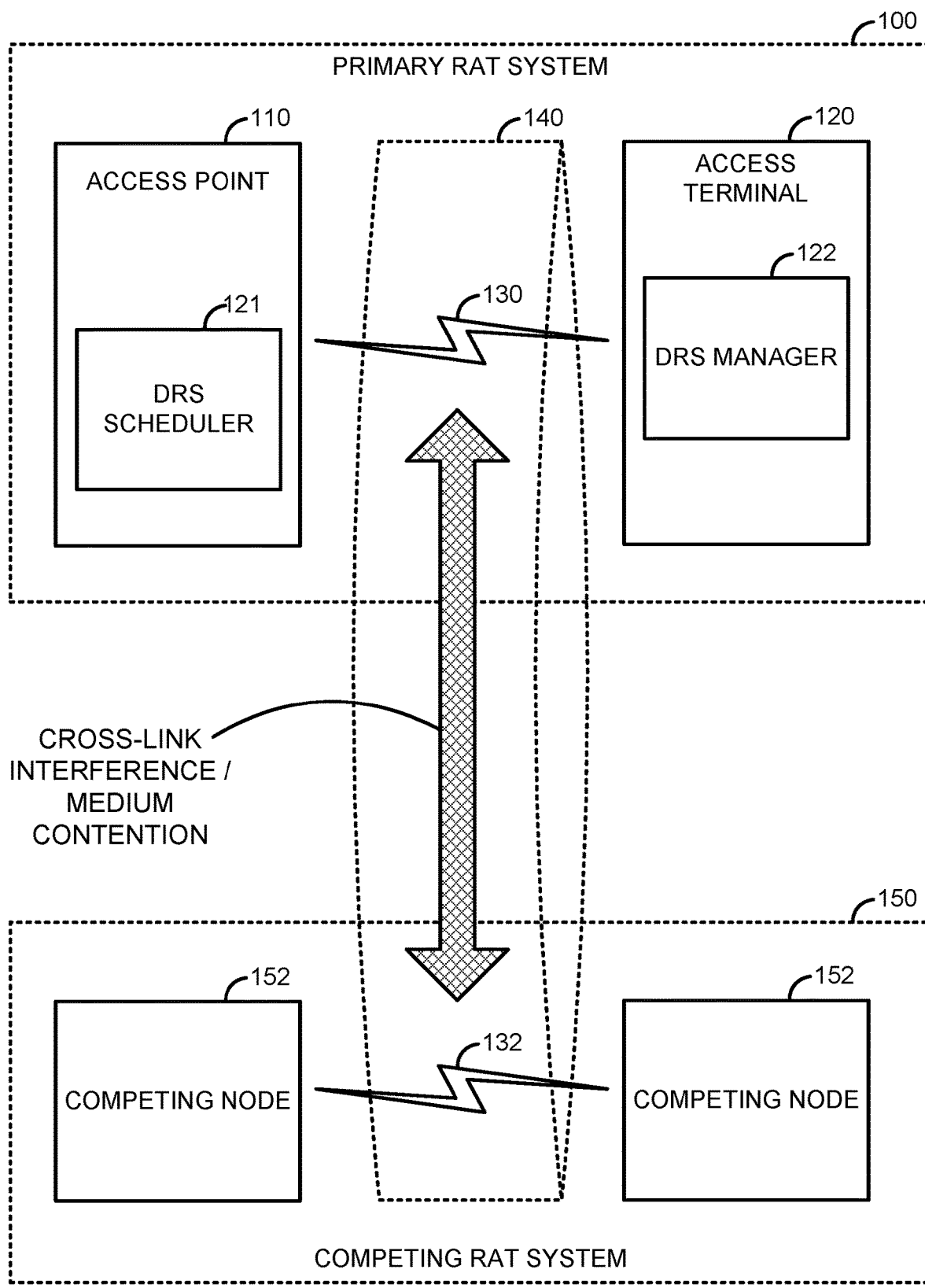
FIG. 1 is a system-level diagram illustrating an example wireless network environment.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a radio link, including information related to various types of communication (e.g., voice, data, multimedia services, associated control signaling, etc.). The primary RAT system 100 is shown as including an access point 110 and an access terminal 120 in communication with each other over a radio link 130. The competing RAT system 150 is shown as including two competing nodes 152 in communication with each other over a separate radio link 132, and may similarly include one or more access points, access terminals, or other types of wireless nodes. As an example, the access point 110 and the access terminal 120 of the primary RAT system 100 may communicate via the radio link 130 in accordance with Long Term Evolution (LTE) technology, while the competing nodes 152 of the competing RAT system 150 may communicate via the radio link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the radio link 130 used by the primary RAT system 100 and the radio link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the radio link 130 and the radio link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 may include a DRS scheduler 121 and the access terminal 120 may include a DRS manager 122. The DRS scheduler 121 may be configured to generate and facilitate transmission of the multi-subframe DRS described below with respect to FIG. 3, and the DRS manager 122 may be configured to facilitate decoding of the multi-subframe DRS at the access terminal 120.

Figure 2:
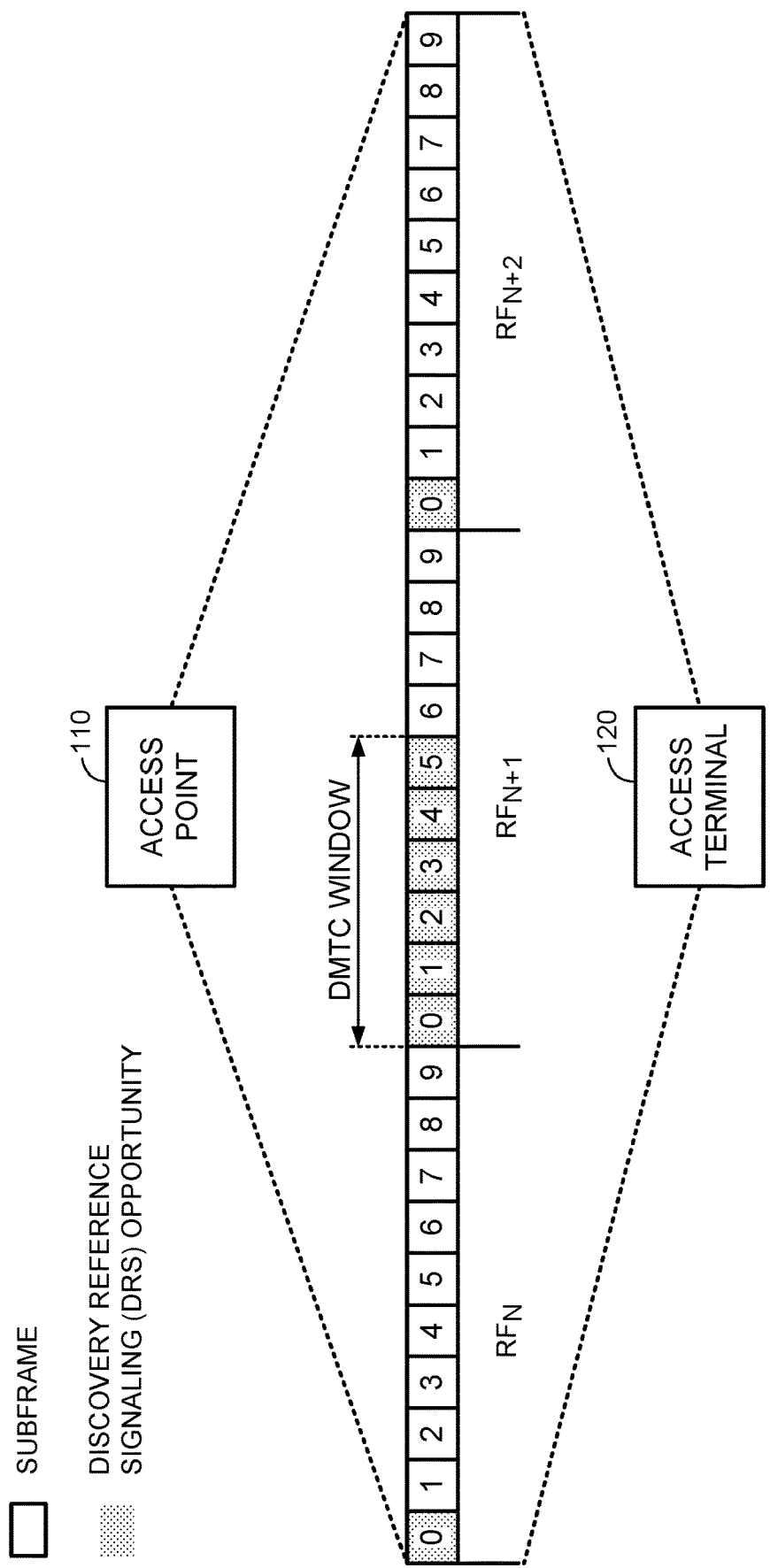
FIG. 2 illustrates an example frame structure according to an aspect of the disclosure.

FIG. 2 illustrates an example frame structure that may be implemented for the primary RAT system 100 on the communication medium 140 to facilitate contention-based access to the communication medium 140.

The illustrated frame structure includes a series of radio frames (RFs) that are numbered in accordance with a system frame number numerology ($RF_N$, $RF_{N+1}$, $RF_{N+2}$, etc.) and divided into respective subframes (SFs), which may also be numbered for reference (e.g., SF0, SF1, etc.). Each respective subframe may be further divided into slots (not shown in FIG. 2), and the slots may be further divided into symbol periods. As an example, the LTE frame structure includes system frames that are divided into 1024 numbered radio frames composed of 10 subframes each, which together constitute a system frame cycle (e.g., lasting 10.24 s for 10 ms radio frames having 1 ms subframes). Moreover, each subframe may comprise two slots, and each slot may comprise six or seven symbol periods. The use of a frame structure may provide more natural and efficient coordination among devices than more ad hoc signaling techniques.

In general, the example frame structure of FIG. 2 may be implemented as a Frequency Division Duplex (FDD) frame structure or a Time Division Duplex (TDD) frame structure. In an FDD frame structure, each subframe on a given frequency may be statically configured for uplink (UL) communication for transmitting uplink information from the access terminal 120 to the access point 110 or for downlink (DL) communication for transmitting downlink information from the access point 110 to the access terminal 120. In a TDD frame structure, each subframe may be variously operated at different times as a downlink (D), uplink (U), or special (S) subframe. Different arrangements of downlink, uplink, and special subframes may be referred to as different TDD configurations.

In some designs, the frame structure of FIG. 2 may be "fixed" in that the location of each subframe may be predetermined in relation to an absolute time, but may or may not be occupied by primary RAT signaling in any given instance due to the contention procedure for accessing the communication medium 140. For example, if the access point 110 or the access terminal 120 fails to win contention for a given subframe that subframe may be silenced. In other designs, however, the frame structure of FIG. 2 may be "floating" in that the location of each subframe may be dynamically determined in relation to the point at which access to the communication medium 140 is secured. For example, the start of a given frame (e.g., $RF_{N+1}$) may be delayed in relation to an absolute time until the access point 110 or the access terminal 120 is able to win contention.

As is further illustrated in FIG. 2, one or more subframes may be designated to include what is referred to herein as Discovery Reference Signaling (DRS). The DRS may be configured to convey reference signaling for facilitating system operation. The reference signaling may include information relevant to timing synchronization, system acquisition, interference measurements (e.g., Radio Resource Measurements (RRM)/Radio Link Measurements (RLM)), tracking loops, gain reference (e.g., Automatic Gain Control (AGC)), paging, etc. As an example, the DRS may include a Primary Synchronization Signal (PSS) and a Secondary Synchronization Signal (SSS) for cell searching, a Cell-specific Reference Signal (CRS) for RRM, a Physical Broadcast Channel (PBCH) for conveying various access parameters, and so on. The DRS may be scheduled for transmission periodically (e.g., every 10 ms) in a designated subframe(s) of each radio frame (e.g., subframe SF0) or in a range of such subframes referred to as a DRS Measurement Timing Configuration (DMTC) window defined around a designated subframe (e.g., spanning the first six subframes SF0 to SF5 of the radio frame).

For LTE operating in licensed spectrum, the periodic DRS signals are used to monitor the quality of the radio link (e.g., radio link 130) and to trigger a Radio Link Failure (RLF) when operating conditions on the radio link deteriorate. In this respect, there are certain key differences between LTE in licensed spectrum and LTE in unlicensed spectrum. First, LTE in unlicensed spectrum has fewer CRS instances due to the relatively sparse DRS periodicity. More specifically, for LTE in licensed spectrum, CRS occurs every SF, whereas for LTE in unlicensed spectrum, DRS typically occurs every 40 ms, 80 ms, or 160 ms. Second, LTE in unlicensed spectrum has missed DRS events, which may be due to an LBT failure at the access point 110 or a CRS scrambling mismatch at the access terminal 120.

According to the MulteFire Alliance specification (e.g., MulteFire 1.0), within a DMTC, DRS scrambling is either SF0 or SF5 scrambling, depending on whether DRS is transmitted on SF0 to SF4 or SF5 to SF9, respectively. On subframes within the DMTC, a subframe may have subframe specific scrambling or DRS scrambling. The ability to monitor one or both CRS scrambling possibilities (i.e., one or both of SF0 and SF5) is a capability of the access terminal 120 defined by the value "mf-MonitorTwoCRSScramblings." Referring again to the MulteFire Alliance specification, within the serving cell DMTC, the access terminal 120 prioritizes the monitoring of signals that use subframe specific scrambling.

Figure 3:
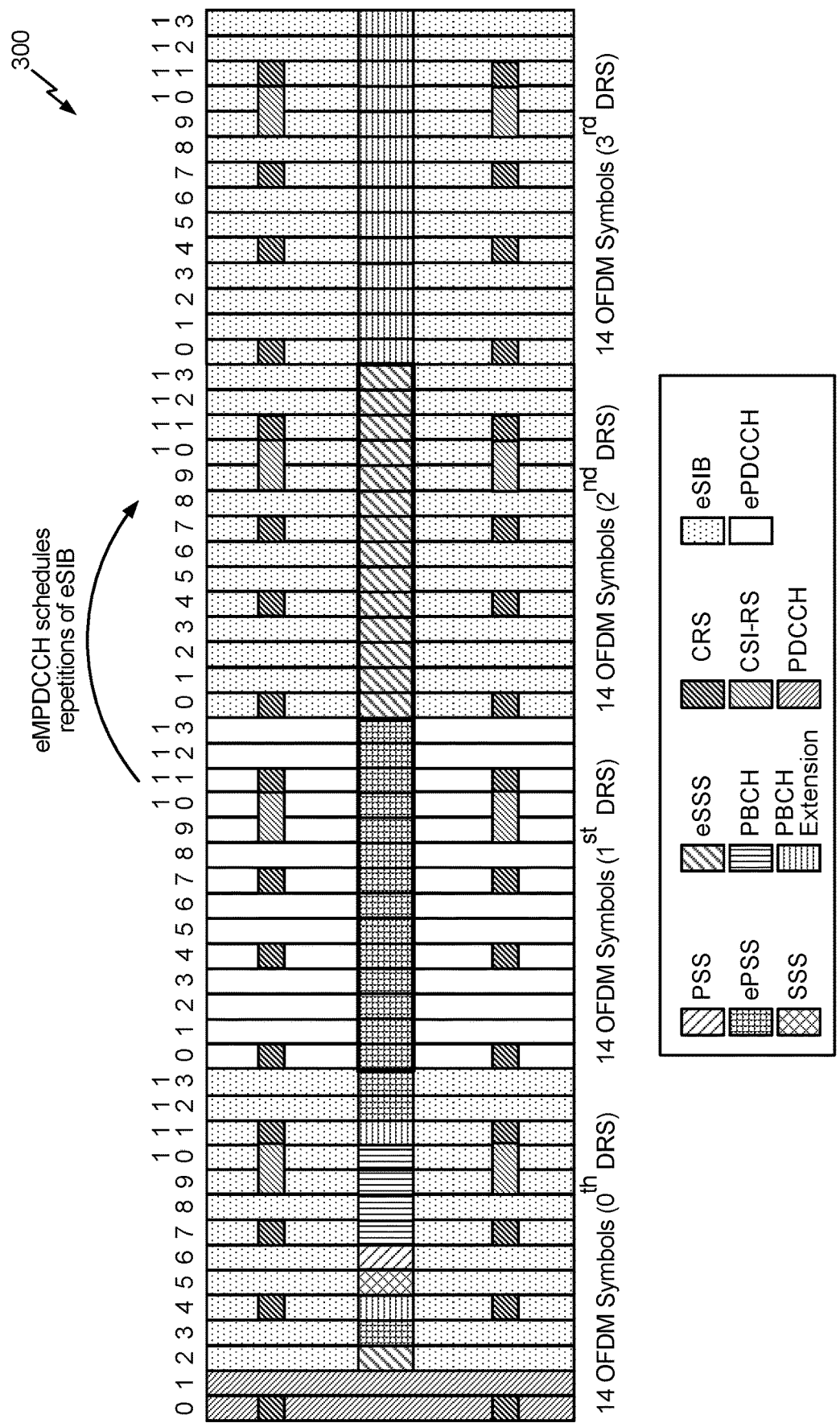
FIG. 3 illustrates multi-subframe Discovery Reference Signaling (DRS) in accordance with an embodiment of the disclosure.

FIG. 3 illustrates a multi-subframe DRS 300 in accordance with an embodiment of the disclosure. In particular, FIG. 3 depicts a resource map of channels to resource blocks within the multi-subframe DRS 300.

In an example, the multi-subframe DRS 300 may be supported by LBT Category 4 (Cat 4). As shown in FIG. 3, the multi-subframe DRS 300 includes subframes 0 . . . 3 (referred to below as the $0^{th}$, $1^{st}$, $2^{nd}$ and $3^{rd}$ DRS subframes) that each include 14 symbols denoted as symbols 0 . . . 13. The first subframe (or $0^{th}$ DRS subframe) is a legacy MulteFire DRS subframe that is extended to 14 symbols. In other embodiments, the multi-subframe DRS 300 may be configured with a different number of DRS subframes (e.g., 5, 6, etc.). The later subframes (e.g., the $1^{st}$, $2^{nd}$ and $3^{rd}$ DRS subframes) may be used for coverage enhancement (CE) for extended PSSs (ePSSs), extended SSSs (eSSSs), an extended PBCH (ePBCH) and extended system information block (eSIBs). In particular, in the example of FIG. 3, the $1^{st}$ DRS subframe may include an ePSS in each of symbols 0 . . . 14 and may be referred to as an ePSS subframe, the $2^{nd}$ DRS subframe may include an eSSS in each of symbols 0 . . . 14 and may be referred to as an eSSS subframe, and the $3^{rd}$ DRS subframe may include an ePBCH in each of symbols 0 . . . 14 and may be referred to as an ePBCH subframe.

Referring to FIG. 3, two PSSs may be included within the multi-subframe DRS 300 for one shot acquisition at a Signal-to-Noise Ratio (SNR) of −6 dB. At least 12 or 14 ePSSs may be included to support 6 Resource Blocks (RBs) on 62 carriers. A different set of ePSS sequences of length 62 may be used in the $1^{st}$ DRS subframe relative to the $0^{th}$ DRS subframe (e.g., ⅓ hypothesis). Use length-12/14 cover code to generate 12/14 repetitions in 12/14 OFDM symbols (similar to Narrow Band (NB)-PSS)

In an embodiment, the eSSS may be repeated over 12/14 symbols in the $2^{nd}$ DRS subframe following the ePSS subframe (or $1^{st}$ DRS subframe). Each eSSS may be configured to convey 1 out of 168 cell IDs within a cell ID group (e.g., assuming 3 hypotheses in ePSS). In an example, the starting symbol of the $2^{nd}$ DRS subframe may be conveyed via the SSS in the $0^{th}$ DRS subframe using a different short code. The short code depends on whether the $2^{nd}$ DRS subframe is located in SF0-SF4 or SF5-SF9.

In another embodiment, the SSS may be configured similarly to Narrow Band SSS (NSSS) in NB-IoT by extending the number of eSSS repetitions to 12/14 symbols and 6 RBs of bandwidth. Each eSSS conveys 1 out of 504 cell IDs (e.g., assuming 1 hypothesis in ePSS).

While the multi-subframe DRS 300 of FIG. 3 depicts an example whereby the $1^{st}$ DRS subframe is an ePSS subframe, the $2^{nd}$ DRS subframe is an eSSS subframe, and the $3^{rd}$ DRS subframe is an ePBCH subframe, other embodiments may be directed to multi-subframe DRSs with other configurations. For example, the $3^{rd}$ DRS subframe may be omitted, and the eSSS and ePSS repetitions may be split between the $1^{st}$ and $2^{nd}$ DRS subframes in other embodiments. Accordingly, the example multi-subframe DRS 300 merely constitutes one example of a multi-subframe DRS, and the terminology of multi-subframe DRS is intended to be broadly construed as any DRS that occupies two or more subframes, irrespective of how various aspects (e.g., eSSS, ePSS, ePBCH, etc.) are mapped to particular subframe(s) in the multi-subframe DRS.

Figure 4:
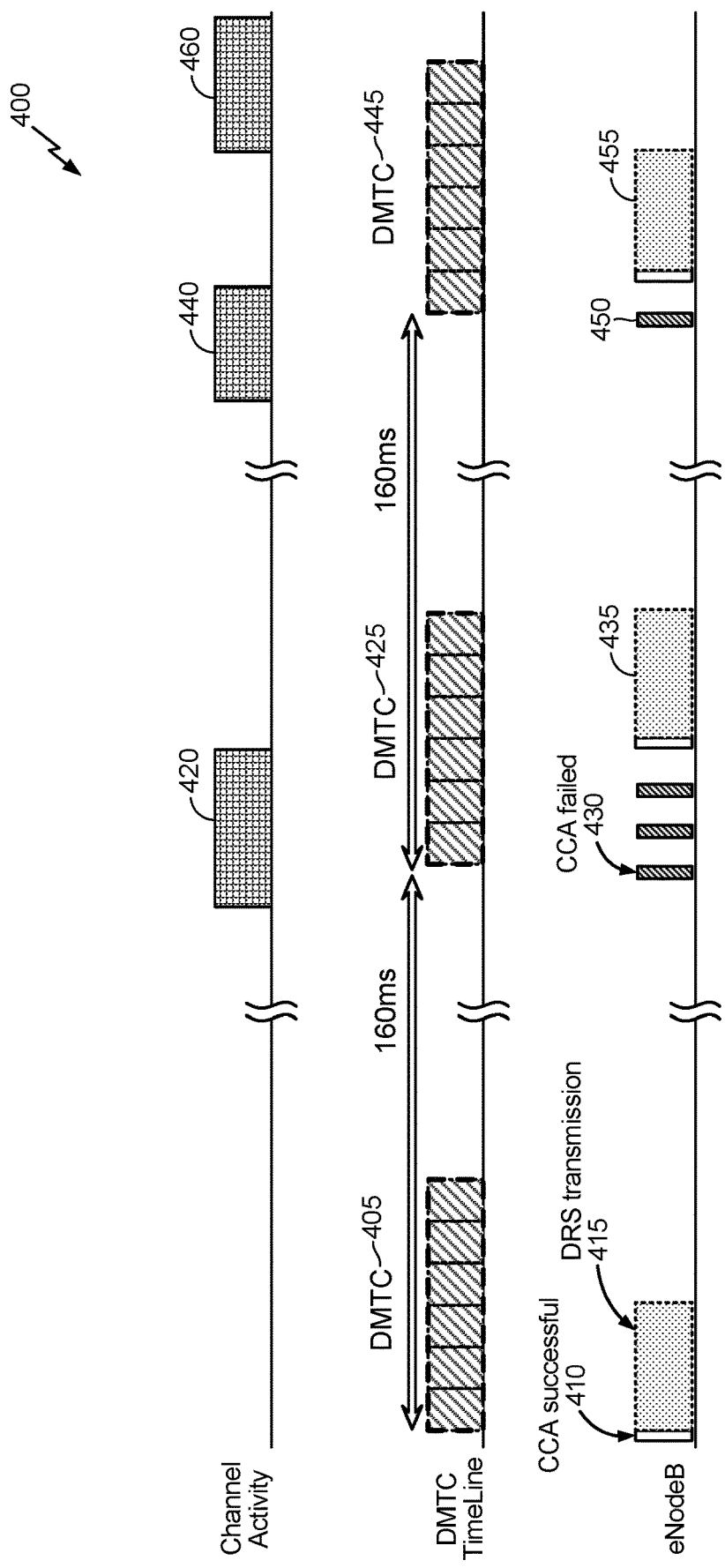
FIG. 4 illustrates a timing diagram depicting an example DRS transmission scheme that may be implemented on a shared communication medium in accordance with another embodiment of the disclosure.

FIG. 4 illustrates a timing diagram 400 depicting an example DRS transmission scheme that may be implemented on the communication medium 140 in accordance with another embodiment of the disclosure. Referring to FIG. 4, it will be appreciated that a DRS may start in any subframe in a DMTC window, and UEs need to descramble CRS (to determine the corresponding cell ID) to decode PBCH after ePSS and eSSS detection. As shown in FIG. 4, the start of a first DMTC window 405 causes the eNodeB to check whether channel is clear at 410 (e.g., via LBT Cat 4). The channel is detected as clear at 410, and the eNodeB then transmits the DRS, such as the multi-subframe DRS 300 described above with respect to FIG. 3. Next, assume that interfering channel activity occurs at 420. At the start of a second DMTC window 425, the eNodeB checks whether the channel is clear at 430 (e.g., via LBT Cat 4). The channel is detected as not being clear (or CCA failed) at 430, which delays transmission of the DRS (e.g., the multi-subframe DRS 300 described above with respect to FIG. 3) until the channel is cleared at 435. Next, assume that interfering channel activity occurs at 440. At the start of a third DMTC window 445, the eNodeB checks whether the channel is clear at 450 (e.g., via LBT Cat 4). The channel is detected as not being clear (or CCA failed) at 450, which delays transmission of the DRS (e.g., the multi-subframe DRS 300 described above with respect to FIG. 3) until the channel is cleared at 455. After the DRS is transmitted at 455, assume that interfering channel activity occurs at 460.

In an embodiment, each eSSS may convey the starting position of the DRS subframe carrying the respective eSSS (e.g., in FIG. 3, the $2^{nd}$ DRS subframe) as SF0 (e.g., between SF0-SF4) or SF5 (e.g., between SF5-SF9). In an example, if the $2^{nd}$ DRS subframe of the multi-subframe DRS 300 falls within SF0-SF4, then the N+1th DRS subframe may use a fixed scrambling (e.g., a hardcoded scrambling, such as a function of subframe position number, for example, SF(N) mod 10 or SF(N−1) mod 10). Accordingly, if the $2^{nd}$ DRS subframe of the multi-subframe DRS 300 falls within SF0-SF4, then the $2^{nd}$ DRS subframe of the multi-subframe DRS 300 may use a scrambling of SF0 mod 10, the $3^{rd}$ DRS subframe of the multi-subframe DRS 300 may use a fixed scrambling of SF0 mod 10 or SF1 mod 10, and so on. In another example, if the $2^{nd}$ DRS subframe of the multi-subframe DRS 300 falls within SF5-SF9, then the N+1th DRS subframe may use a fixed scrambling of SF(N+4) mod 10 or SF(N+5) mod 10. Accordingly, if the $2^{nd}$ DRS subframe of the multi-subframe DRS 300 falls within SF5-SF9, then the $2^{nd}$ DRS subframe of the multi-subframe DRS 300 may use a scrambling of SF5 mod 10, the $3^{rd}$ DRS subframe of the multi-subframe DRS 300 may use a scrambling of SF5 mod 10 or SF6 mod 10, and so on. Of course, other fixed scrambling rules for the scrambling applied to DRS subframe(s) following the DRS subframe containing the eSSS could also be used in other embodiments.

In another embodiment, each eSSS may not convey the starting position of the multi-subframe DRS 300 as SF0 (e.g., between SF0-SF4) or SF5 (e.g., between SF5-SF9).). In an example, the N+1th DRS subframe may use a fixed scrambling of SF(N) mod 10 or SF(N−1) mod 10. Accordingly, the $2^{nd}$ DRS subframe of the multi-subframe DRS 300 may use a scrambling of SF0 mod 10, the $3^{rd}$ DRS subframe of the multi-subframe DRS 300 may use a scrambling of SF0 mod 10 or SF1 mod 10, and so on.

In a further embodiment, MulteFire Alliance specifications, such as MulteFire 1.0, may specify that each PBCH payload is configured with 23 bits+16 cyclic redundancy check (CRC) bits (49 bits/360Resource Elements (REs)), code rate 49/720) with an SNR requirement of −1.5 dB. PBCH repetition within a DMTC window and combining across DMTC windows may be implemented to achieve coverage enhancement (CE).

Referring again to FIG. 3, in each subframe, 11-14 symbols can be considered as available for the new PBCH (or ePBCH). In an example, the ePBCH in one DRS subframe can provide 3 dB coverage over a legacy PBCH as defined in MulteFire 1.0. In a further example, 3-4 DRS subframes either back-to-back or spread between multiple DMTC windows can provide 9 dB-12 dB coverage over legacy PBCH subframe as defined in MulteFire 1.0. As shown in the multi-subframe DRS 300 of FIG. 3, the ePBCH repetition may begin at the $3^{rd}$ DRS subframe, after the ePSS repetition in the $1^{st}$ DRS subframe and the eSSS repetition in the $2^{nd}$ DRS subframe. In an example, the ePBCH (or coverage enhancement (CE)-PBCH) may be punctured by regular CRS, and MF 1.0 (or legacy) PSS/SSS/PBCH.

Figure 5:
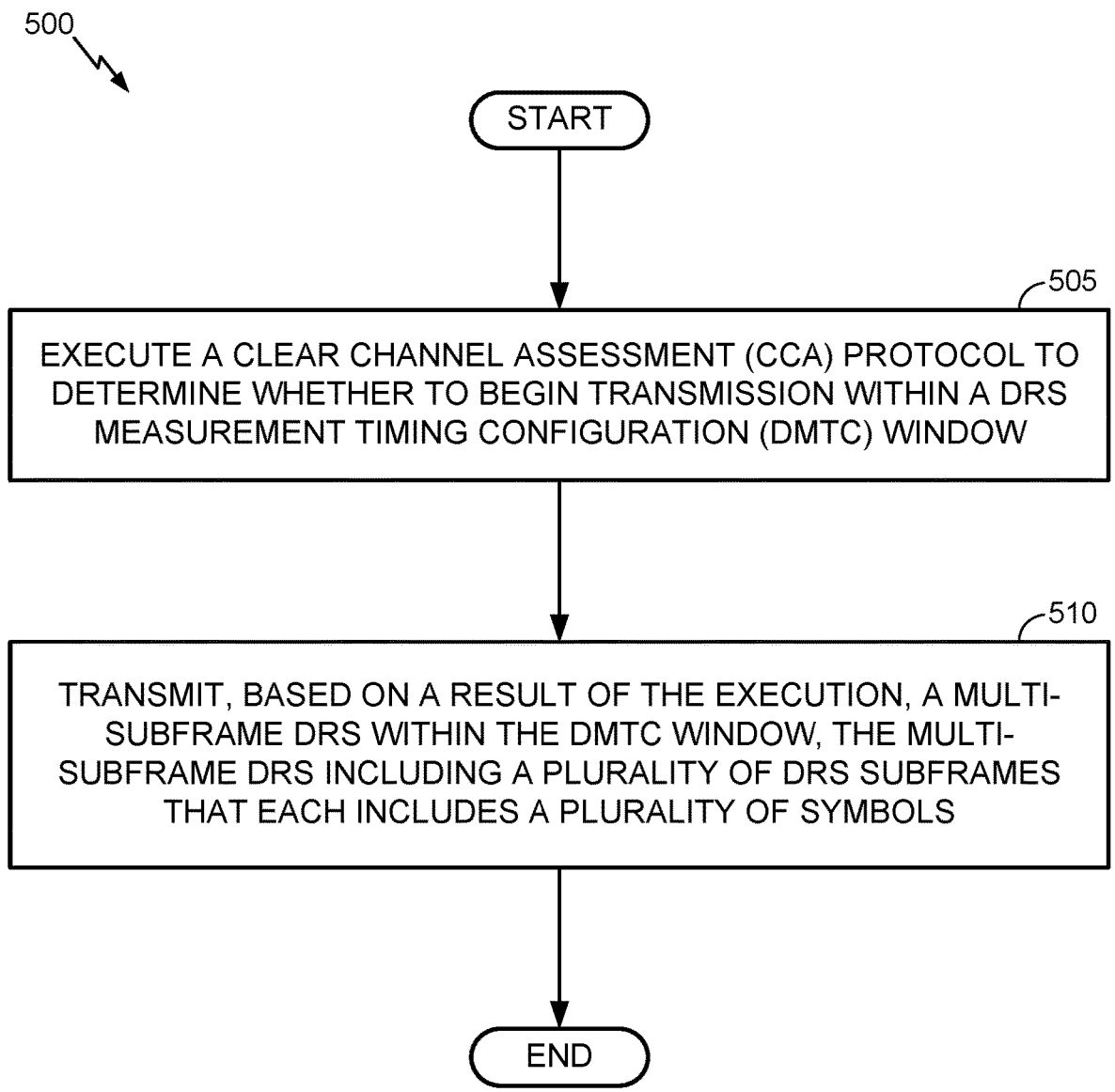
FIG. 5 illustrates a DRS transmission procedure accordance with an embodiment of the disclosure.

FIG. 5 illustrates a DRS transmission procedure 500 in accordance with an embodiment of the disclosure. In an example, the DRS transmission procedure 500 of FIG. 5 is performed by an access point, such as the access point 110 of FIG. 1. In an example, the DRS transmission procedure 500 of FIG. 5 may result in the timing diagram 400 of FIG. 4.

Referring to FIG. 5, at block 505, the access point executes a CCA protocol to determine whether to begin transmission within a DMTC window. In an example, the CCA protocol may include distinct CCA-PD and CCA-ED mechanisms, such as LBT Category 4. At block 510, the access point transmits, based on a result of the execution of block 505, a multi-subframe DRS within the DMTC window, the multi-subframe DRS including a plurality of DRS subframes that each includes a plurality of symbols (e.g., the multi-subframe DRS 300 of FIG. 3 or some other multi-frame DRS).

Figure 6:
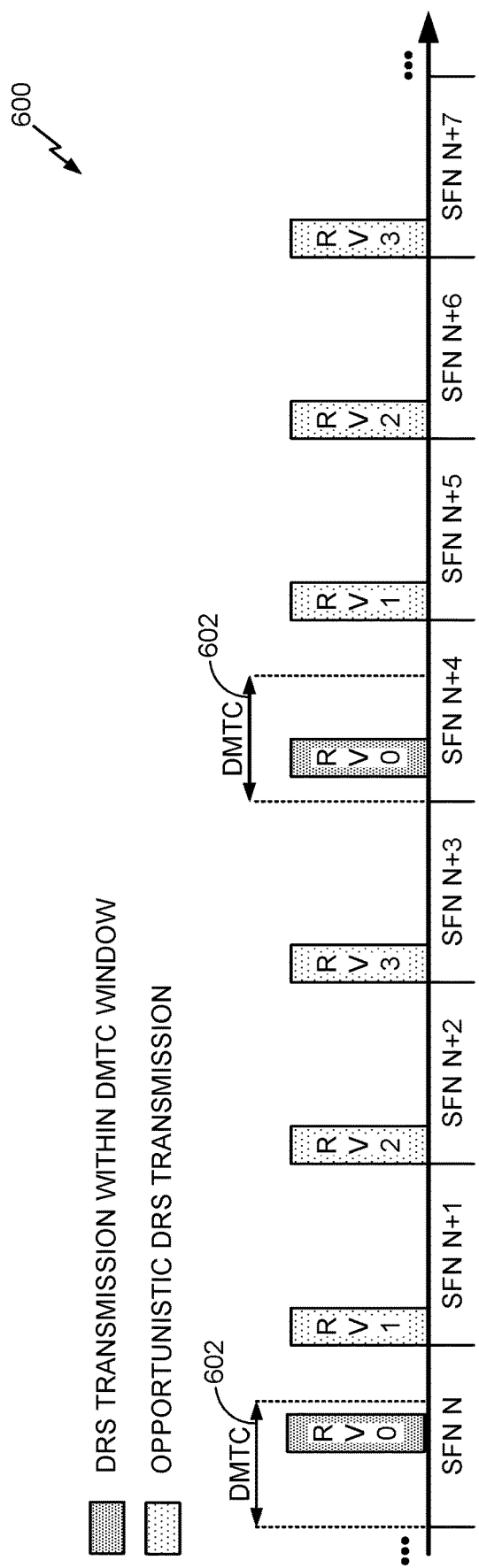
FIG. 6 illustrates a timing diagram depicting an example DRS transmission scheme that may be implemented on a shared communication medium in accordance with another embodiment of the disclosure.

FIG. 6 illustrates a timing diagram 600 depicting an example DRS transmission scheme that may be implemented on the communication medium 140 in accordance with another embodiment of the disclosure. As shown, in some instances, the access point 110 may transmit the DRS opportunistically in a designated subframe when access to the communication medium 140 is available for that designated subframe. Otherwise, when access to the communication medium 140 is not available for the designated subframe, the access point 110 may refrain from transmitting the DRS until the next designated subframe. Opportunistic DRS transmission (e.g., which may be used for legacy MulteFire 1.0 but not necessarily in later versions, such as MulteFire 1.1+) at a designated subframe is shown by way of example in FIG. 6 at radio frames System Frame Number (SFN) N+1, SFN N+2, SFN N+3, SFN N+4, SFN N+5, SFN N+6, and SFN N+7.

In other instances, however, the access point 110 may transmit the DRS more flexibly, at any time access to the communication medium 140 is available within a larger DMTC window 602 defined around a designated subframe (e.g., spanning the first 6+ subframes SF0 to SF5 of the radio frame). DRS transmission within the DMTC window 602 is shown by way of example in FIG. 6 at radio frames SFN N and SFN N+4 (e.g., the period of DMTC may be 40 ms, 80 ms or 160 ms). The access terminal 120 may be configured to monitor the communication medium 140 for DRS within each defined DMTC window 602.

The corresponding DMTC window 602 may be scheduled periodically (e.g., every 40 ms, 80 ms or 160 ms) in designated radio frames, which can be coordinated with the access terminal 120. In the illustrated example, the DMTC window 602 is scheduled every fourth radio frame at SFN N, SFN N+4, and so on. It will be appreciated, however, that other configurations may be employed as desired to balance the different DRS transmission schemes.

In either case, certain signaling included in the DRS may be transmitted with a corresponding redundancy version (RV), as appropriate, at least for an otherwise common payload. In the illustrated example, such signaling may be transmitted with a first redundancy version (RV0) in a first instance (SFN N within the DMTC 602), a second redundancy version (RV1) in the next instance (SFN N+1), a third redundancy version (RV2) in the next instance (SFN N+2), a fourth redundancy version (RV3) in the next instance (SFN N+3), and repeat from there as shown when the payload changes (e.g., every fourth radio frame). Use of different redundancy versions may allow for combining gains across time as well as other informational uses.

While illustrated in FIG. 6, the opportunistic DRS transmissions shown in FIG. 6 as RV1~RV3 may be omitted for ePBCH repetition for CE mode (e.g., whereby CE mode corresponds to the multi-subframe DRS 300 depicted in FIG. 3). So, if RV1-RV3 are transmitted, the RV1-RV3 transmissions may be implemented via the legacy MulteFire 1.0 format in contrast to the multi-subframe DRS format depicted in FIG. 3 (e.g., because a coverage-enhanced UE may not decode RV1-RV3). In an example, the reason for not transmitting ePBCH with CE with RV1-RV3 in opportunistic DRS is that the DMTC window may be 20, 30 ms. The ePBCH in DRS could move around 3 frames but always transmit with RV0. Also, the repetition in multi-subframe DRS already take up a high number of subframes. For these reasons, in at least one embodiment, the coverage enhanced ePBCH RV1-RV4 need not be implemented.

As will be described in more detail below, the PBCH that may be included in the DRS may be used to convey certain parameters related to accessing the access point 110, such as the downlink system bandwidth, the most significant bits of the system frame number, and so on. The PBCH may also carry information on a technology identifier as well. Some of the reserved bits in the PBCH may be used to convey this information. For instance, some of the reserved bits may be used to indicate that the PBCH transmission corresponds to access point transmission based on a certain version of MulteFire technology as opposed to another technology operating in the same bandwidth.

While PSS/SSS detection may allow the access terminal to synchronize its clock timing, the ePBCH that may be included in the DRS (e.g., configured as shown above in the multi-subframe DRS 300) may further be used to convey the SFN timing (e.g., in 10 ms increments due to long repetition), as will now be explained in detail.

Referring to FIGS. 3 and 6, in an example, to derive the SFN timing (i.e., identification of the SFN), the SFN of the $3^{rd}$ DRS subframe or the SF in which ePBCH repetition is started is considered as the baseline and is encoded in the PBCH payload. Only ePBCH RV0 is transmitted in the DMTC window 602 starting at the SFN, 10·SFN mod $T_{DMTC}$=0, whereby $T_{DMTC}$ is the period of DMTC window, $T_{DMTC} \in \{ \ldots, 160, 320\}$. The opportunistic DRS transmissions at RV1, RV2 and RV3 may be removed. In an example, each SFN may include 10 bits, and each ePBCH payload may include $$\left(10 - \log_2 \frac{\min(T_{DMTC})}{10}\right)$$

MSB bits out of the 10 available SFN bits to provide the SFN indication. If $\min(T_{DMTC})$=160 ms, only 6 bits is carried for SFN indication Referring to FIGS. 3 and 4, the floating nature of ePSS/eSSS may make indicating subframe timing difficult. For example, as noted above, the eSSS may or may not provide side information that indicates whether the $2^{nd}$ DRS subframe is within SF0-SF4 or SF5-SF9 depending on the eSSS design configuration. It may thereby be difficult to accommodate a DMCW window greater than 10 ms due to long repetitions of ePSSs and eSSSs.

In an embodiment, to derive the subframe timing, the ePBCH may include a subframe offset index (e.g., 3 or 4 bits). The subframe offset index defines an offset of $1^{st}$ DRS subframe or $3^{rd}$ DRS subframe with respect to the actual subframe 0 or subframe 5. In an example, the subframe offset index of the $3^{rd}$ DRS subframe or the first signaling of ePBCH with respect to SF0 or SF5. In an example, to accommodate a large DMTC window that $2^{nd}$ DRS subframe or first signaling of ePBCH may start at next frame, the PBCH may include a frame offset index (e.g., 1 or 2 bits, which specify the offset with respect to the first frame of the DMTC window). In an example, the frame offset of the starting position may be indicated with respect to 10·SFN mod $T_{DMTC}$=0. In an example, the subframe offset index and frame offset index may constitute two separate indices that may be included in the PBCH or ePBCH.

In an embodiment, the multi-subframe DRS configuration described above may be configured to extend MulteFire coverage for deployment within industrial IoT networks and/or automated guided vehicles (AGV) networks. For example, certain AGVs specify a minimum operating bandwidth of 150 kbps with 3× the amount of coverage relative to Wi-Fi or IEEE 802.11 (e.g., 16 dB gain needed over Wi-Fi, SNR requirement of −14 dB), and the above-noted multi-subframe DRS configuration can satisfy these requirements.

Figure 7:
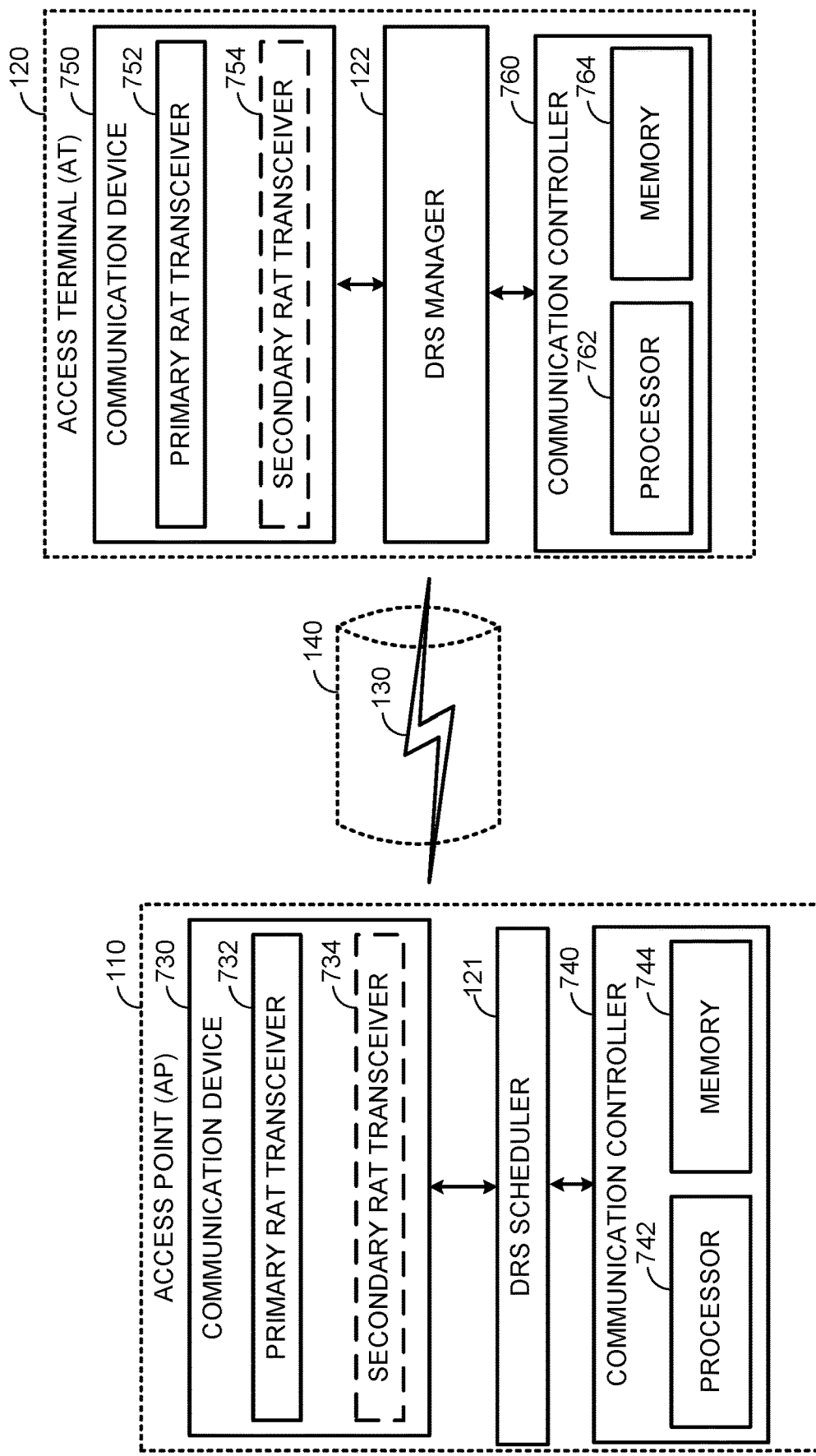
FIG. 7 is a device-level diagram illustrating example components of the access point and the access terminal of the primary RAT system of FIG. 1 in more detail.

FIG. 7 is a device-level diagram illustrating example components of the access point 110 and the access terminal 120 of the primary RAT system 100 in more detail. As shown, the access point 110 and the access terminal 120 may each generally include a wireless communication device (represented by the communication devices 730 and 750) for communicating with other wireless nodes via at least one designated RAT. The communication devices 730 and 750 may be variously configured for transmitting and encoding signals, and, conversely, for receiving and decoding signals in accordance with the designated RAT (e.g., messages, indications, information, pilots, and so on).

The communication devices 730 and 750 may include, for example, one or more transceivers, such as respective primary RAT transceivers 732 and 752, and, in some designs, (optional) co-located secondary RAT transceivers 734 and 754, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 740 and 760) for controlling operation of their respective communication devices 730 and 750 (e.g., directing, modifying, enabling, disabling, etc.). The communication controllers 740 and 760 may include one or more processors 742 and 762, and one or more memories 744 and 764 coupled to the processors 742 and 762, respectively. The memories 744 and 764 may be configured to store data, instructions, or a combination thereof, either as on-board cache memory, as separate components, a combination, etc. The processors 742 and 762 and the memories 744 and 764 may be standalone communication components or may be part of the respective host system functionality of the access point 110 and the access terminal 120.

It will be appreciated that the DRS scheduler 121 may be implemented in different ways. In some designs, some or all of the functionality associated therewith may be implemented by or otherwise at the direction of at least one processor (e.g., one or more of the processors 742), at least one memory (e.g., one or more of the memories 744), at least one transceiver (e.g., one or more of the transceivers 732 and 734), or a combination thereof. In other designs, some or all of the functionality associated therewith may be implemented as a series of interrelated functional modules.

It will be appreciated that the DRS manager 122 may be implemented in different ways. In some designs, some or all of the functionality associated therewith may be implemented by or otherwise at the direction of at least one processor (e.g., one or more of the processors 762), at least one memory (e.g., one or more of the memories 764), at least one transceiver (e.g., one or more of the transceivers 752 and 754), or a combination thereof. In other designs, some or all of the functionality associated therewith may be implemented as a series of interrelated functional modules.

Accordingly, it will be appreciated that the components in FIG. 7 may be used to perform operations described above with respect to FIGS. 1-5.

Figure 8:
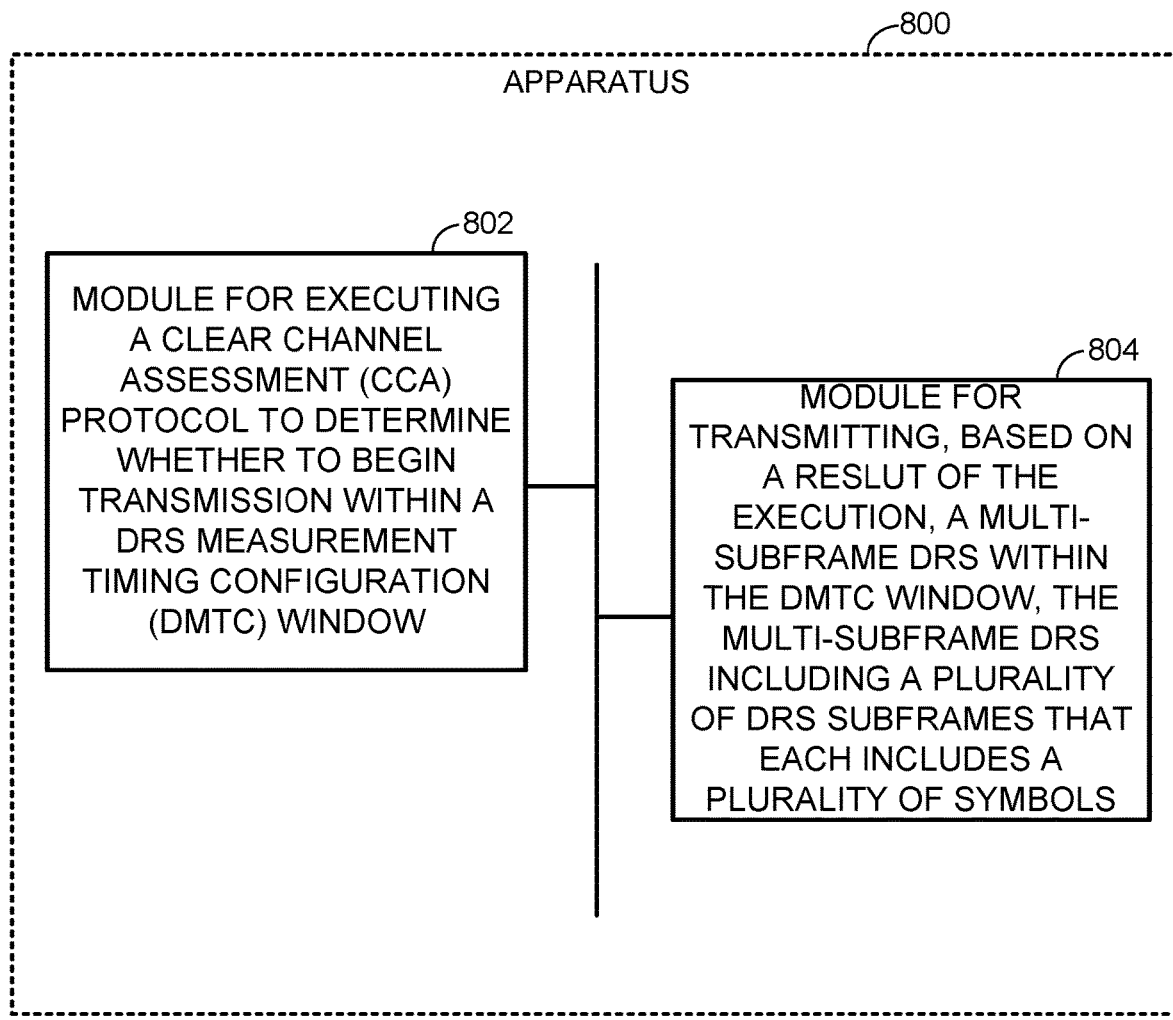
FIG. 8 illustrates an example apparatus for implementing DRS transmission techniques discussed herein at an access point represented as a series of interrelated functional modules in accordance with an embodiment of the disclosure.

FIG. 8 illustrates an example apparatus 800 for implementing the DRS transmission techniques discussed herein (e.g., with respect to FIGS. 3-6) at an access point represented as a series of interrelated functional modules in accordance with an embodiment of the disclosure. In the illustrated example, the apparatus 800 includes a module for executing 802, and a module for transmitting 804.

The module for executing 802 may be configured to execute a CCA protocol to determine whether to begin transmission within a DMTC window (e.g., 505 of FIG. 5). The module for transmitting 804 may be configured to transmit, based on a result of the execution performed by the module for executing 802, a multi-subframe DRS within the DMTC window, the multi-subframe DRS including a plurality of DRS subframes that each includes a plurality of symbols (e.g., 510 of FIG. 5).

The functionality of the modules of FIG. 8 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 8, as well as other components and functions described herein, may be implemented using any suitable means. Such means also may be implemented, at least in part, using corresponding structure as taught herein. For example, the components described above in conjunction with the "module for" components of FIG. 8 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well as in sequences of actions that may be represented by pseudocode. For example, the components and functions represented by FIG. 8 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of configuring a Discovery Reference Signaling (DRS) on a shared communication medium, comprising:
    executing, by an access point (AP), a Clear Channel Assessment (CCA) protocol to determine whether to begin transmission within a DRS Measurement Timing Configuration (DMTC) window; and
    transmitting, by the AP based on a result of the executing, a multi-subframe DRS within the DMTC window, the multi-subframe DRS including a plurality of DRS subframes that each includes a plurality of symbols,
    wherein a first scrambling is defined for a first set of subframes of the DMTC window and a second scrambling is defined for a second set of subframes of the DMTC window, and
    wherein the transmitting scrambles the plurality of DRS subframes of the multi-subframe DRS in accordance with a fixed scrambling corresponding to the first scrambling irrespective of whether the plurality of DRS subframes are split between the first and second sets of subframes of the DMTC window, or wherein the transmitting scrambles the plurality of DRS subframes of the multi-subframe DRS in accordance with a fixed scrambling corresponding to the second scrambling irrespective of whether the plurality of DRS subframes are split between the first and second sets of subframes of the DMTC window,
    wherein a given DRS subframe of the plurality of DRS subframes includes a set of extended Secondary Synchronization Signal (eSSS) repetitions,
    wherein each eSSS specifies whether a starting position of a given DRS subframe that contains the eSSS within the multi-subframe DRS is in a first five subframes of the DMTC window or in a last five subframes of the DMTC window, and
    wherein the fixed scrambling is a function of:
        (i) a subframe position number of a first of the first five subframes within the DMTC window, or
        (ii) a subframe position number of a second of the first five subframes of the given DRS subframe within the DMTC window, or
        (iii) a subframe position number of a first of the last five subframes of the given DRS subframe within the DMTC window, or
        (iv) a subframe position number of a second of the last five subframes of the given DRS subframe within the DMTC window.

2. The method of claim 1, wherein the plurality of DRS subframes includes a set of extended Primary Synchronization Signal (ePSS) repetitions, the set of eSSS repetitions, and a set of extended Physical Broadcast Channel (ePBCH) repetitions.

3. The method of claim 2, wherein the plurality of DRS subframes includes:
    a first DRS subframe that is configured as an extended version of a legacy DRS,
    a second DRS subframe including the set of ePSS repetitions in a corresponding set of resource blocks of the second DRS subframe,
    a third DRS subframe including the set of eSSS repetitions in a corresponding set of resource blocks of the third DRS subframe, and a fourth DRS subframe including the set of ePBCH repetitions in a corresponding set of resource blocks of the fourth DRS subframe.

4. The method of claim 2, wherein each ePBCH among the set of ePBCH repetitions includes an ePBCH payload that is configured to convey a System Frame Number (SFN) timing for a respective DRS subframe containing the ePBCH.

5. The method of claim 4,
wherein the DMTC window is 160 ms,
wherein each SFN includes 10 bits, and
wherein each ePBCH payload includes $$\left(10 - \log_2 \frac{\min(T_{DMTC})}{10}\right)$$

most significant bits (MSB) with 6 bits being carried for indicating the SFN timing.

6. The method of claim 2, wherein each ePBCH among the set of ePBCH repetitions includes subframe or frame offset indices.

7. The method of claim 1,
wherein the given DRS subframe uses a scrambling that is a function of the subframe position number of the first of the first five subframes of the given DRS subframe within the DMTC window based on the starting position of the given DRS subframe being in the first five subframes of the DMTC window.

8. The method of claim 7, wherein a subframe following the given DRS subframe uses the fixed scrambling.

9. The method of claim 1, wherein the fixed scrambling is a function of (i) the subframe position number of the first of the first five subframes of the given DRS subframe within the DMTC window.

10. The method of claim 1,
wherein the given DRS subframe uses a scrambling that is a function of the subframe position number of the first of the last five subframes of the given DRS subframe within the DMTC window based on the starting position of the given DRS subframe being in the last five subframes of the DMTC window.

11. The method of claim 10, wherein a subframe following the given DRS subframe uses the fixed scrambling.

12. The method of claim 1, wherein the fixed scrambling is a function of (iii) the subframe position number of the first of the last five subframes of the given DRS subframe within the DMTC window.

13. The method of claim 1, wherein the CCA protocol is Listen Before Talk (LBT) Category 4.

14. An access point apparatus configured to transmit a Discovery Reference Signaling (DRS) on a shared communication medium, comprising:
means for executing, by the access point apparatus, a Clear Channel Assessment (CCA) protocol to determine whether to begin transmission within a DRS Measurement Timing Configuration (DMTC) window; and
means for transmitting, by the access point apparatus based on a result of the execution, a multi-subframe DRS within the DMTC window, the multi-subframe DRS including a plurality of DRS subframes that each includes a plurality of symbols,
wherein a first scrambling is defined for a first set of subframes of the DMTC window and a second scrambling is defined for a second set of subframes of the DMTC window, and
wherein the means for transmitting scrambles the plurality of DRS subframes of the multi-subframe DRS in accordance with a fixed scrambling corresponding to the first scrambling irrespective of whether the plurality of DRS subframes are split between the first and second sets of subframes of the DMTC window, or wherein the transmitting scrambles the plurality of DRS subframes of the multi-subframe DRS in accordance with a fixed scrambling corresponding to the second scrambling irrespective of whether the plurality of DRS subframes are split between the first and second sets of subframes of the DMTC window,
wherein a given DRS subframe of the plurality of DRS subframes includes a set of extended Secondary Synchronization Signal (eSSS) repetitions,
wherein each eSSS specifies whether a starting position of a given DRS subframe that contains the eSSS within the multi-subframe DRS is in a first five subframes of the DMTC window or in a last five subframes of the DMTC window, and
wherein the fixed scrambling is a function of:
(i) a subframe position number of a first of the first five subframes within the DMTC window, or
(ii) a subframe position number of a second of the first five subframes of the given DRS subframe within the DMTC window, or
(iii) a subframe position number of a first of the last five subframes of the given DRS subframe within the DMTC window, or
(iv) a subframe position number of a second of the last five subframes of the given DRS subframe within the DMTC window.

15. The access point apparatus of claim 14, wherein the plurality of DRS subframes includes a set of extended Primary Synchronization Signal (ePSS) repetitions, the set of eSSS repetitions, and a set of extended Physical Broadcast Channel (ePBCH) repetitions.

16. The access point apparatus of claim 14,
wherein the given DRS subframe uses a scrambling that is a function of the subframe position number of the first of the first five subframes of the given DRS subframe within the DMTC window based on the starting position of the given DRS subframe being in the first five subframes of the DMTC window.

17. The access point apparatus of claim 16, wherein a subframe following the given DRS subframe uses the fixed scrambling.

18. The access point apparatus of claim 14,
wherein the given DRS subframe uses a scrambling that is a function of the subframe position number of the first of the last five subframes of the given DRS subframe within the DMTC window based on the starting position of the given DRS subframe being in the last five subframes of the DMTC window.

19. The access point apparatus of claim 18, wherein a subframe following the given DRS subframe uses the fixed scrambling.

20. An access point apparatus configured to transmit a Discovery Reference Signaling (DRS) on a shared communication medium, comprising:
at least one processor coupled to at least one transceiver and configured to cause the access point apparatus to:
execute, by the access point apparatus, a Clear Channel Assessment (CCA) protocol to determine whether to begin transmission within a DRS Measurement Timing Configuration (DMTC) window; and transmit, by the access point apparatus based on a result of the execution, a multi-subframe DRS within the DMTC window, the multi-subframe DRS including a plurality of DRS subframes that each includes a plurality of symbols, wherein a first scrambling is defined for a first set of subframes of the DMTC window and a second scrambling is defined for a second set of subframes of the DMTC window, and wherein the at least one processor is configured to scramble the plurality of DRS subframes of the multi-subframe DRS in accordance with a fixed scrambling corresponding to the first scrambling irrespective of whether the plurality of DRS subframes are split between the first and second sets of subframes of the DMTC window, or wherein the transmitting scrambles the plurality of DRS subframes of the multi-subframe DRS in accordance with a fixed scrambling corresponding to the second scrambling irrespective of whether the plurality of DRS subframes are split between the first and second sets of subframes of the DMTC window, wherein a given DRS subframe of the plurality of DRS subframes includes a set of extended Secondary Synchronization Signal (eSSS) repetitions, wherein each eSSS specifies whether a starting position of a given DRS subframe that contains the eSSS within the multi-subframe DRS is in a first five subframes of the DMTC window or in a last five subframes of the DMTC window, and wherein the fixed scrambling is a function of:
   (i) a subframe position number of a first of the first five subframes within the DMTC window, or
   (ii) a subframe position number of a second of the first five subframes of the given DRS subframe within the DMTC window, or
   (iii) a subframe position number of a first of the last five subframes of the given DRS subframe within the DMTC window, or
   (iv) a subframe position number of a second of the last five subframes of the given DRS subframe within the DMTC window.

21. The access point apparatus of claim 20, wherein the plurality of DRS subframes includes a set of extended Primary Synchronization Signal (ePSS) repetitions, the set of eSSS repetitions, and a set of extended Physical Broadcast Channel (ePBCH) repetitions.

22. The access point apparatus of claim 20,
wherein the given DRS subframe uses a scrambling that is a function of the subframe position number of the first of the first five subframes of the given DRS subframe within the DMTC window based on the starting position of the given DRS subframe being in the first five subframes of the DMTC window.

23. The access point apparatus of claim 22, wherein a subframe following the given DRS subframe uses the fixed scrambling.

24. The access point apparatus of claim 20,
wherein the given DRS subframe uses a scrambling that is a function of the subframe position number of the first of the last five subframes of the given DRS subframe within the DMTC window based on the starting position of the given DRS subframe being in the last five subframes of the DMTC window.

25. The access point apparatus of 27, wherein a subframe following the given DRS subframe uses the fixed scrambling.

26. A non-transitory computer-readable storage medium containing instructions stored thereon, which, when executed by an access point apparatus configured to transmit a Discovery Reference Signaling (DRS) on a shared communication medium, cause the access point apparatus to perform operations, the instructions comprising:
   at least one instruction configured to cause the access point apparatus to execute a Clear Channel Assessment (CCA) protocol to determine whether to begin transmission within a DRS Measurement Timing Configuration (DMTC) window; and
   at least one instruction configured to cause the access point apparatus to transmit, based on a result of the execution, a multi-subframe DRS within the DMTC window, the multi-subframe DRS including a plurality of DRS subframes that each includes a plurality of symbols, wherein a first scrambling is defined for a first set of subframes of the DMTC window and a second scrambling is defined for a second set of subframes of the DMTC window, and wherein the at least one instruction configured to cause the access point apparatus to transmit is further configured to cause the access point to scramble the plurality of DRS subframes of the multi-subframe DRS in accordance with a fixed scrambling corresponding to the first scrambling irrespective of whether the plurality of DRS subframes are split between the first and second sets of subframes of the DMTC window, or wherein the transmitting scrambles the plurality of DRS subframes of the multi-subframe DRS in accordance with a fixed scrambling corresponding to the second scrambling irrespective of whether the plurality of DRS subframes are split between the first and second sets of subframes of the DMTC window, wherein a given DRS subframe of the plurality of DRS subframes includes a set of extended Secondary Synchronization Signal (eSSS) repetitions, wherein each eSSS specifies whether a starting position of a given DRS subframe that contains the eSSS within the multi-subframe DRS is in a first five subframes of the DMTC window or in a last five subframes of the DMTC window, and wherein the fixed scrambling is a function of:
   (i) a subframe position number of a first of the first five subframes within the DMTC window, or
   (ii) a subframe position number of a second of the first five subframes of the given DRS subframe within the DMTC window, or
   (iii) a subframe position number of a first of the last five subframes of the given DRS subframe within the DMTC window, or
   (iv) a subframe position number of a second of the last five subframes of the given DRS subframe within the DMTC window.

27. The non-transitory computer-readable storage medium of claim 26, wherein the plurality of DRS subframes includes a set of extended Primary Synchronization Signal (ePSS) repetitions, the set of eSSS repetitions, and a set of extended Physical Broadcast Channel (ePBCH) repetitions.

* * * * *